(12) United States Patent
Symons

(10) Patent No.: US 9,095,800 B2
(45) Date of Patent: Aug. 4, 2015

(54) LOW PROFILE FRAME FOR A FILTER INCORPORATING A NEGATIVE PRESSURE CHECK MECHANISM

(71) Applicant: Scott Technologies, Inc., Boca Raton, FL (US)

(72) Inventor: Daniel Charles Symons, Waxhaw, NC (US)

(73) Assignee: Scott Technologies, Inc., Boca Raton, FL (US)

( * ) Notice: Subject to any disclaimer, the term of this patent is extended or adjusted under 35 U.S.C. 154(b) by 71 days.

(21) Appl. No.: 13/944,944

(22) Filed: Jul. 18, 2013

(65) Prior Publication Data

US 2013/0298512 A1  Nov. 14, 2013

Related U.S. Application Data

(63) Continuation of application No. PCT/US2012/021954, filed on Jan. 20, 2012.

(60) Provisional application No. 61/434,761, filed on Jan. 20, 2011.

(51) Int. Cl.
| | |
|---|---|
| B01D 46/00 | (2006.01) |
| A62B 23/00 | (2006.01) |
| A62B 23/02 | (2006.01) |
| B01D 46/02 | (2006.01) |
| A62B 18/08 | (2006.01) |
| A62B 27/00 | (2006.01) |
| B01D 46/10 | (2006.01) |

(52) U.S. Cl.
CPC ............ *B01D 46/0005* (2013.01); *A62B 18/08* (2013.01); *A62B 23/00* (2013.01); *A62B 23/02* (2013.01); *A62B 27/00* (2013.01); *B01D 46/02* (2013.01); *B01D 46/10* (2013.01); *B01D 2271/02* (2013.01)

(58) Field of Classification Search
CPC .... A62B 23/02; A62B 23/00; B01D 46/0005; B01D 46/023; B01D 46/026; B01D 46/02
USPC ......... 55/490, DIG. 12, DIG. 35; 128/206.16, 128/206.17
See application file for complete search history.

(56) References Cited

U.S. PATENT DOCUMENTS

| | | | |
|---|---|---|---|
| 5,046,406 | A | 9/1991 | Harris et al. |
| 6,408,845 | B1 | 6/2002 | Pereira et al. |
| 7,188,622 | B2 | 3/2007 | Martin et al. |
| 8,230,860 | B2 | 7/2012 | Dankert et al. |
| 2004/0255947 | A1 | 12/2004 | Martin et al. |
| 2005/0139216 | A1 | 6/2005 | Mittelstadt et al. |
| 2010/0252045 | A1 | 10/2010 | Frick et al. |
| 2010/0319676 | A1 | 12/2010 | Morton |

FOREIGN PATENT DOCUMENTS

| | | |
|---|---|---|
| CN | 1809401 A | 7/2006 |
| CN | 1981895 A | 6/2007 |

*Primary Examiner* — Robert Clemente
(74) *Attorney, Agent, or Firm* — Wyatt B. Pratt

(57) ABSTRACT

A low-profile filter frame is disclosed for maintaining an open filter plenum configuration during normal operation, and for enabling quick and reliable negative pressure testing. The frame has upper and lower halves. A breathing tube in the lower half connects to a respirator port. The upper and lower halves snap together to maintain the structure in an assembled configuration. The halves also include features that bias the halves apart when the device is in the assembled configuration, thereby maintaining the breathing tube open. To perform a fit test, a force is applied to an outer surface of the upper half, which moves the halves together, in opposition to the bias, so that the upper half seals against the breathing tube. The frame can be provide in as a single-piece, with a living hinge connecting upper and lower halves, or the upper and lower halves can be separate pieces.

20 Claims, 11 Drawing Sheets

LOW PROFILE FRAME FOR A FILTER INCORPORATING A NEGATIVE PRESSURE CHECK MECHANISM

CROSS-REFERENCE TO RELATED APPLICATIONS

This application is a continuation of International Patent Application No. PCT/US2012/021954 filed Jan. 20, 2012, which claims the benefit of U.S. Provisional Patent Application No. 61/434,761, filed Jan. 20, 2011, the contents of both of which are incorporated herein by reference.

FIELD OF THE DISCLOSURE

The invention is generally related to the field of air filtration systems, more particularly to respiratory protection devices, and specifically relating to an improved pancake filter arrangement for use with respiratory protection devices.

BACKGROUND OF THE DISCLOSURE

Respiratory protection devices are used in a wide variety of service applications to protect users from the effects of toxic or irritant particulate materials dispersed in the air. Such respirators are only fully effective, however, if they fit the user's face and head and if they have been donned properly. Performing a negative pressure fit check is a common method of ensuring proper facepiece fit and to ensure that the facepiece has been properly donned. This can typically be accomplished by using ones palms to cover the inlet of the filters installed on the respirator facepiece and inhaling. The inhaled breathe causes a negative pressure within the facepiece and allows the user to assess the seal and leak tightness of the facepiece by observing the pressure decay within the facepiece. When using ones palms to cover the inlet of the filters, however, the force required to effect a proper seal between the palms and the filter may be substantial and may cause the user to deflect the face seal of the respirator creating either false negative or false positive results. When using low profile particulate filters (often referred to as "pancake" filters) this fit check can become difficult if not impossible as there may be no way to completely cover the entire media surface due to its size/shape.

Some particulate filters employ a rigid frame around the outside such that the media is only exposed on the top. This allows for the effective use of palm sealing, but such filters are typically neither low profile nor flexible enough to interface with other personnel protective equipment the way a typical pancake filter can. Other filter styles employ semi flexible internal frame structures which allow for the desirable personnel protective equipment interfaces previously discussed. However, such styles do not allow the user to perform a negative pressure leak check as the user cannot cover the entire surface area of the filter media due to their size and shape.

It would be desirable to provide an improved "pancake" style particulate and/or nuisance filter that incorporates a negative pressure check mechanism that is easily and reliably actuated by a user.

SUMMARY OF THE DISCLOSURE

A single piece filter frame structure is disclosed. The structure includes a frame having upper and lower halves and a living hinge disposed therebetween. The upper and lower halves can be configured to cooperate with a low profile particulate filter. The upper and lower halves may further include a snap joint for engaging the upper half to the lower half when the device is folded at the living hinge to maintain the structure in an assembled configuration. The frame includes an open plenum configuration in which a filter plenum is held in an open position. The frame also includes a negative pressure check configuration in which a portion of the upper half seals against a portion of the lower half to facilitate seal and leak tightness of a facepiece associated with the filter structure.

A filter structure is disclosed. The filter structure includes a frame having an upper portion and a lower portion, where the upper and lower portions are configured to cooperate with a low profile particulate filter. The lower portion may include a fulcrum bar to engage a cantilever beam of the upper portion to bias the upper and lower pieces apart. The frame is selectively movable between an open plenum configuration and a negative pressure check configuration. Thus arranged, when the frame is in the open plenum configuration, a filter plenum is held in an open position, and when the frame is in the negative pressure check configuration the upper portion seals against the lower portion to facilitate seal and leak tightness of a facepiece associated with the filter structure.

A filter arrangement is disclosed. The filter arrangement includes a frame having upper and lower halves and a living hinge disposed therebetween. The arrangement further includes a low profile particulate filter positioned to cooperate with the upper and lower halves. The lower half of the frame includes a breathing tube for connecting to an associated port of a respirator. The upper and lower halves further may include a snap joint for engaging the upper half to the lower half when the device is folded at the living hinge. The snap joint maintains the structure in a folded configuration. The lower half further includes a fulcrum bar to engage a cantilever beam of the upper half to bias the upper and lower halves apart when the device is in the folded configuration. Thus arranged, when the structure is in the folded configuration, a force applied to an outer surface of the upper half moves the upper half toward the lower half in opposition to the bias of the fulcrum bar and cantilever beam so that the upper half seals against the breathing tube.

A filter structure is disclosed, comprising a single-piece frame having upper and lower halves and a living hinge disposed therebetween. The lower half may include a breathing tube for connecting to an associated port of a respirator. The upper and lower halves further may include a snap joint for engaging the upper half to the lower half when the device is folded at the living hinge. The snap joint may maintain the structure in a folded configuration. The lower half may further include a fulcrum bar to engage a cantilever beam of the upper half to bias the upper and lower halves apart when the device is in the folded configuration. Thus arranged, when the structure is in the folded configuration, a force applied to an outer surface of the upper half may move the upper half toward the lower half in opposition to the bias of the fulcrum bar and cantilever beam so that the upper half seals against the breathing tube.

BRIEF DESCRIPTION OF THE DRAWINGS

By way of example, a specific embodiment of the disclosed device will now be described, with reference to the accompanying drawings.

DETAILED DESCRIPTION

An improved flexible "pancake" style particulate and/or nuisance filter is disclosed that incorporates a negative pressure check mechanism that is easily actuated by a user. The negative pressure check mechanism is incorporated into a single frame structure that employs the use of a "living hinge" to connect the breathing tube structure to the sealing mechanism structure. In the standard position the sealing mechanism frame is bent over the breathing tube frame and held in tension, which biases the frame open. In addition, this bias serves to hold an open plenum, which is the normal operating configuration of the filter. From this open plenum configuration, a force can be applied to the structure to overcome the bias and to press the sealing mechanism against the breathing tube, which seals off the breathing tube so that a negative pressure test of the associated facepiece or respiratory protection device can be performed. Thus, the disclosed design provides multi-functionality not found in prior devices. That is, a force can be applied to the frame to facilitate a negative pressure check (i.e., during fit testing), and then the force can be released so that the device assumes a normal open plenum configuration for use.

The disclosed design solves problems inherent the prior art designs by incorporating a sealing mechanism inside the filter media that directly seals to the breathing tube, and thus little force is required in order to affect the fit test seal. This is accomplished while also keeping the profile of the filter low.

The disclosed design includes a sealing mechanism that is integral to the frame structure of the filter. The sealing mechanism is easily operated by the user with minimal force so as not to adversely affect the seal between the respirator and the user when the check is performed. The disclosed design can be moldable as a single piece, thus reducing part count and cost. Alternatively, the design can be formed in multiple pieces and fit together during assembly. As noted, the disclosed design can hold the plenum of the filter media open, thus allowing for proper distribution of air flow across the media when in the standard (i.e., operating) position. The disclosed design may also facilitate closure of plenum, by application of a small force to the filter frame, to enable a negative pressure check of the filter to be performed.

Figure 1:
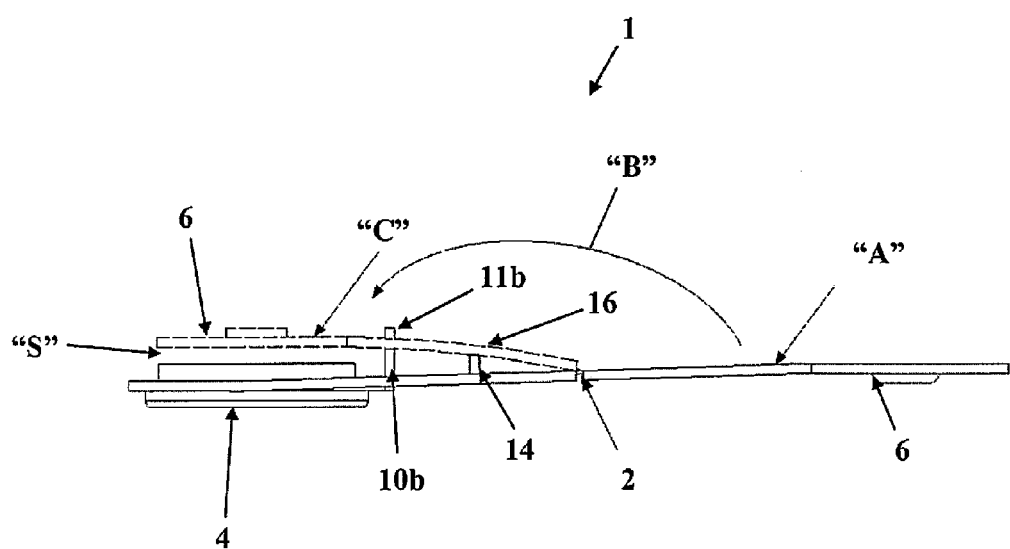
FIG. 1 is a side view of the disclosed internal filter frame structure in the unassembled and assembled configurations.
Figure 2:
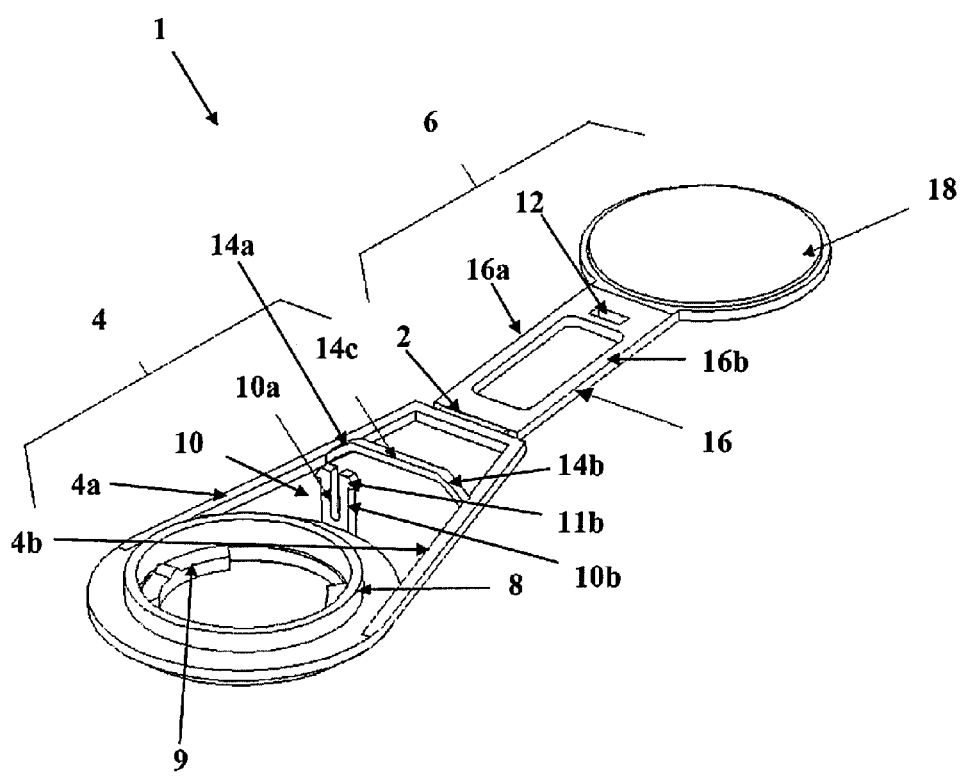
FIG. 2 is an isometric view of the internal filter frame structure of FIG. 1 showing the device in the unassembled configuration.

Referring now to FIGS. 1 and 2, the disclosed design includes a frame structure 1 that provides a negative pressure check mechanism in a single piece that is molded in a flat position (position "A") and includes a living hinge 2 that enables the frame structure 1 to be folded in the direction of arrow "B" into a standard operating position (position "C," shown in dashed lines).

FIG. 2 shows the frame structure 1 in the flat position ("A"), which is how the frame will be molded, for embodiments in which the frame structure 1 is provided as a single piece. The frame structure 1 includes a lower half 4 and an upper half 6 positioned on opposite sides of the living hinge 2. The lower half 4 includes a breathing tube 8 that can be configured to connect to a respirator (not shown) using any of a variety of connection arrangements (e.g., bayonet, thread, push to connect, etc.). The particular configuration used to effect such connections can be incorporated within the breathing tube 8 (for example, along inner surface 9), thus keeping the profile of the structure as low as possible against the respirator.

To assemble the frame structure 1 for use, the upper half 6 and lower half 4 are folded toward each other in the direction of arrow "B" until the upper half overlies the lower half 4 (position "C" of FIG. 1). To hold the halves 4, 6 together, a projection 10 in the lower half 4 engages a corresponding recess 12 in the upper half 6. In the illustrated embodiment, this projection 10 is a snap connector that includes a pair of outwardly biased fingers 10a, b having barbed tips 11a, 11b. When the fingers 10a, b are pressed into the recess 12 they compress together to enable the barbed tips 11a, b to pass though the recess 12. Once the tips 11a, b have passed through the recess 12 the arms 10a, b spring back outward to lock the projection 10 in the recess 12. If necessary, the halves 4, 6 can be unlocked by squeezing the tips 11a, b together and pulling the projection 10 back through the recess 12. It will be appreciated that although the projection is illustrated in the lower half, and the recess is shown in the upper half, the two could be switched so that the projection is provided in the upper half and the recess in the lower half.

Thus, when the frame structure 1 is folded, the snap mechanism holds the lower and upper halves 4, 6 in the standard (i.e., operating) position. In operation, it is desirable that the breathing tube 8 be held open to allow for the ingress of air to the filter media surrounding the frame structure 1. Thus, the frame structure 1 may include one or more features designed to bias the upper half 6 away from the breathing tube 8 during normal operation. In the illustrated embodiment, this achieved through the interaction of a fulcrum bar/cantilever beam arrangement.

As shown, the lower half 4 includes a fulcrum bar 14 with first and second legs 14a, 14b that connect to opposite lateral sides 4a, 4b of the lower half 4. The fulcrum bar 14 also includes a central portion 14c that extends upward toward the upper half 6 when the structure 1 is folded. On the upper half 6, opposite lateral sides of the half serve as cantilever beams 16a, 16b that engage the central portion 14c and/or the first and second legs 14a, of the fulcrum bar 14. Thus, when the structure 1 is folded (position "C" of FIG. 1), the fulcrum bar 14 engages the cantilever beams 16a, b, and biases the upper half 6 away from the lower half 4 and spaces the upper half 6 a distance "S" away from the breathing tube 8.

Though the halves are biased apart via the interaction of the fulcrum bar and cantilever beams, the upper and lower halves remain connected via the interaction between the snap connector 10 and recess 12.

Figure 3:
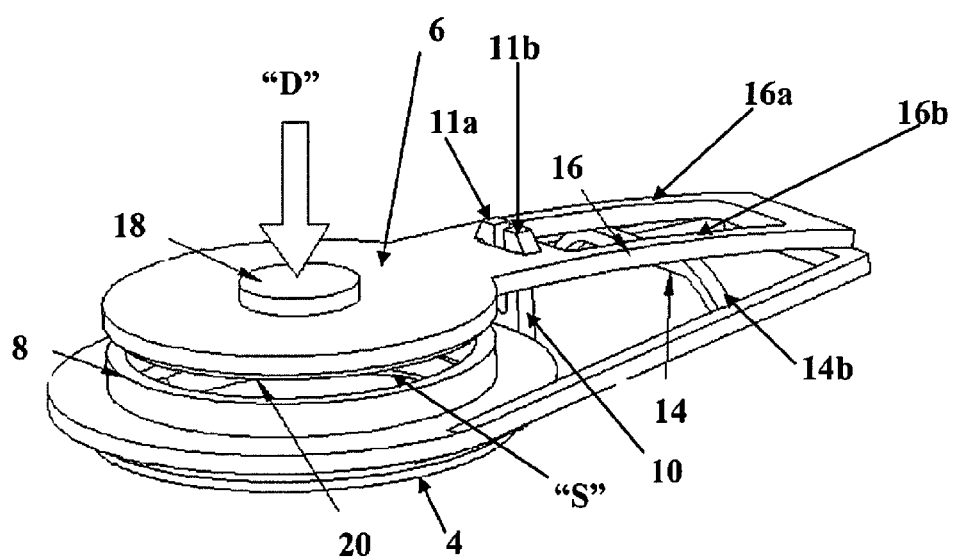
FIG. 3 is an isometric view of the internal filter frame structure of FIG. 1 showing the device in the assembled configuration.

Referring now to FIG. 3, a negative pressure leak check can be performed by pressing down on the upper half 6 along the direction of arrow "D." By applying a light force to the top sealing mechanism 18 positioned on the upper half 6, the user can selectively seal the breathing tube 8 to achieve a seal between a soft seal 20 on the upper half 6 and the breathing tube 8. In one embodiment, the soft seal 20 may be a piece of die cut rubber or elastomeric material attached to the surface of the upper half 6. Alternatively, the soft seal 20 may be an overmolded piece of material suitable to provide a desired sealing between the upper half 6 and the breathing tube 8. Use of a soft seal is an advantage because it can easily conform to the surface of the breathing tube 8, thus reducing the impact of any surface discontinuities and/or misalignment between the upper half 6 and the breathing tube 8.

As force is applied to the top sealing mechanism 18, the cantilever beams 16a, 16b are bent about the fulcrum bar 14. The amount of force required to affect a seal is controllable by the cross section of the cantilever beams 16a, b, the length of the beams, and position of the fulcrum bar 14. The amount of force required should be kept to a minimum such that when the force is applied it does not translate through the mask face seal and affect the seal of the respirator to the users face. It will also be appreciated that the use of a soft seal can also advantageously reduce the force required to affect a seal between the upper half 6 and the breathing tube 8.

It will be appreciated that although the illustrated embodiment shows a pair of cantilever beams and a fulcrum bar having a pair of legs and a central portion, other bar and beam arrangements can also be used to bias the halves in the open position. For example, the fulcrum bar could comprise a pair of bars, while the cantilever beams may instead be a single beam. Other biasing arrangements are also contemplated.

Figure 4A:
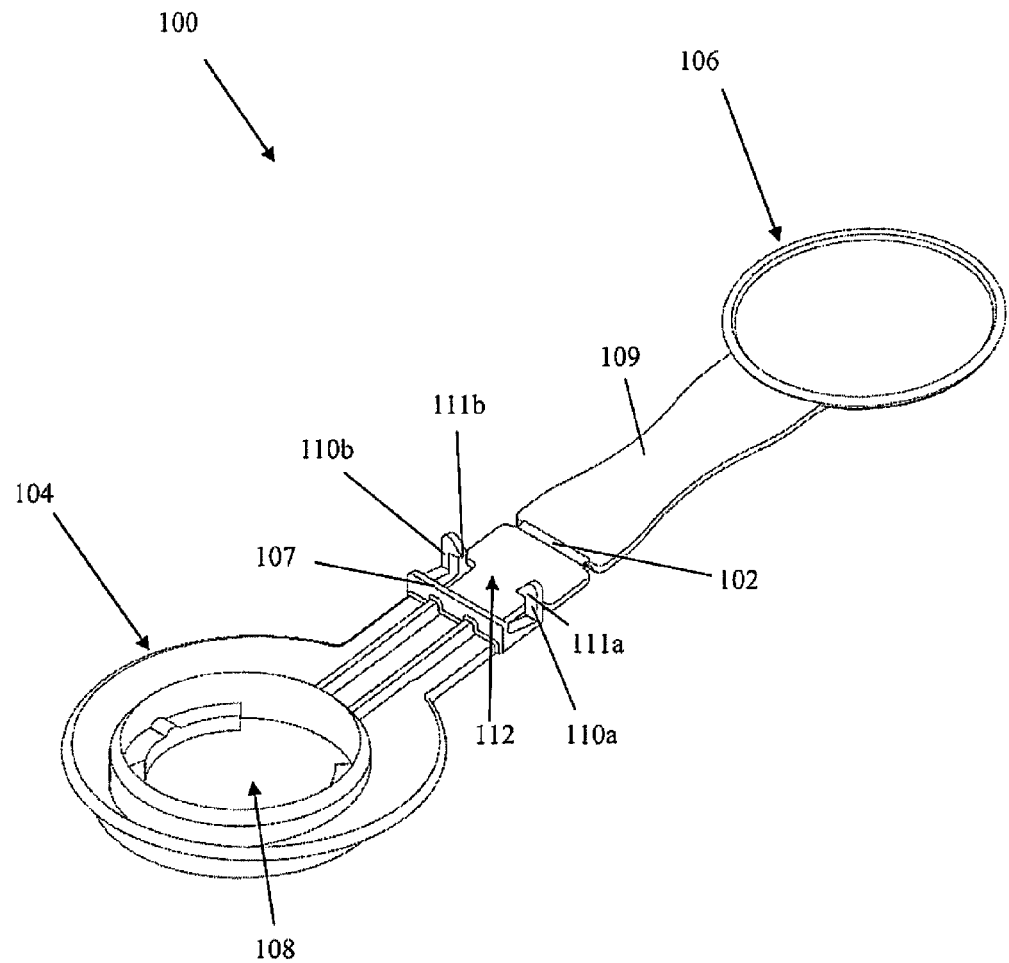
FIG. 4A is an isometric view of an alternative embodiment of an internal filter frame structure according to the disclosure, showing the device in the unassembled configuration.
Figure 4B:
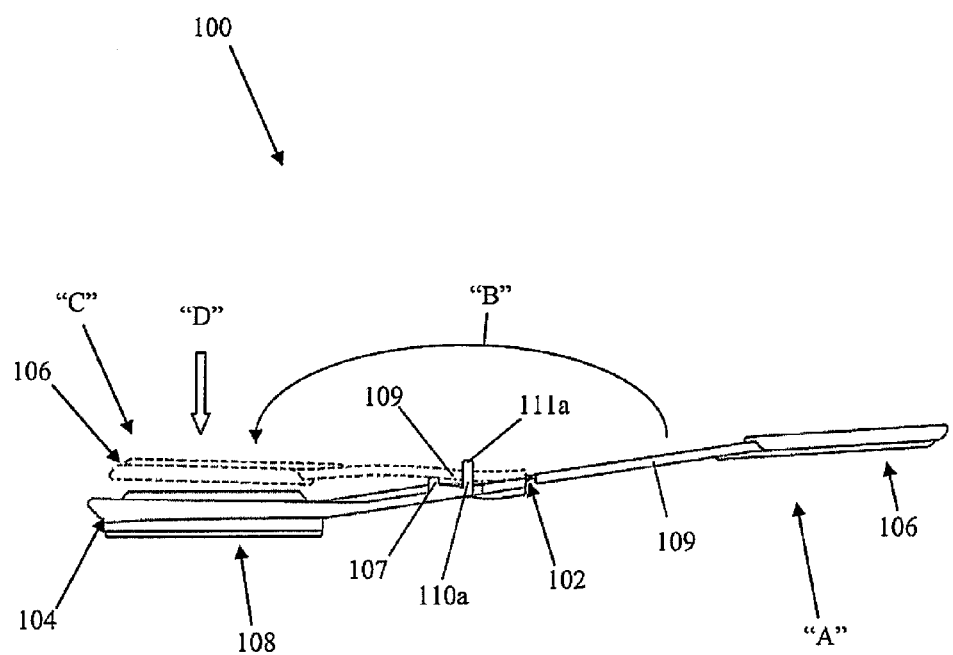
FIG. 4B is a side view of the alternative frame structure of FIG. 4A in the unassembled and assembled configuration.

For example, FIGS. 4A and 4B show an embodiment of a frame structure 100, including lower and upper halves 104, 106 connected at a living hinge 102. With this embodiment, however, the outward biasing is provided by a fulcrum bar 107 on the lower half 104 which bears upon a flexible midsection 109 of the upper half 106 when the halves are folded together at the living hinge 102 to obtain the assembled configuration (see FIG. 4B, dashed lines). As can be seen, the lower and upper halves 104, 106 are held together by a snap connector, which in this embodiment includes a pair of spaced apart arms 110a, 110b forming a recess 112 therebetween. The recess 112 may be sized to be the same width as, or slightly greater than, the width of the midsection 109 of the upper half 106. The spaced apart arms 110a, 110b can have barbed tips 111a, 111b disposed at distal ends thereof, and the barbed tips may extend into the recess 112. Thus arranged, when the midsection 109 of the upper half 106 is pressed into the recess 112 of the lower half 104, midsection 109 contacts the barbed tips 111a, 111b and pushes the arms 110a, 110b apart so that the midsection 109 can pass into the recess 112. Once midsection 109 passes the barbed tips 111a, 111b, the arms 110a, 110b spring back inward to lock the midsection 109 in the recess 112. If desired, the halves 104, 106 can be unlocked by pressing the tips 111a, b apart and pulling the midsection 109 of the upper half 106 back through the recess 112.

As shown in FIG. 4B, when the upper half 106 is locked to the lower half 104, the midsection 109 of the upper half bears against the fulcrum bar 107, biasing the upper half 106 away from the lower half 104 and spacing the upper half 106 a distance "S" away from the breathing tube 108. This provides the previously described open plenum configuration, which is the normal operating configuration. To perform fit testing, slight pressure can be applied to the upper half 106 (in the direction of arrow "D") to overcome the bias and to seal the upper half 106 to the breathing tube 108.

One advantage of the snap arrangement of FIGS. 4A and 4B is that the arms 110a, 110b are positioned between the fulcrum bar 107 and the living hinge 102, which enables the upper half 106 to be "pre-stressed" by positioning the snap connector slightly lower than the fulcrum bar 107. This arrangement allows for enhanced bias as compared to arrangements in which bias is achieved only through cantilevering the upper half on the fulcrum.

As with the embodiment of FIGS. 1-3, the embodiment of FIGS. 4A and 4B can be molded as a single piece in the flat configuration (position "A") of FIG. 4A. Folding the lower and upper halves 104, 106 together in the direction of arrow "B" configures the frame structure 100 into the standard operating position (position "C," shown in dashed lines.)

Figure 5A:
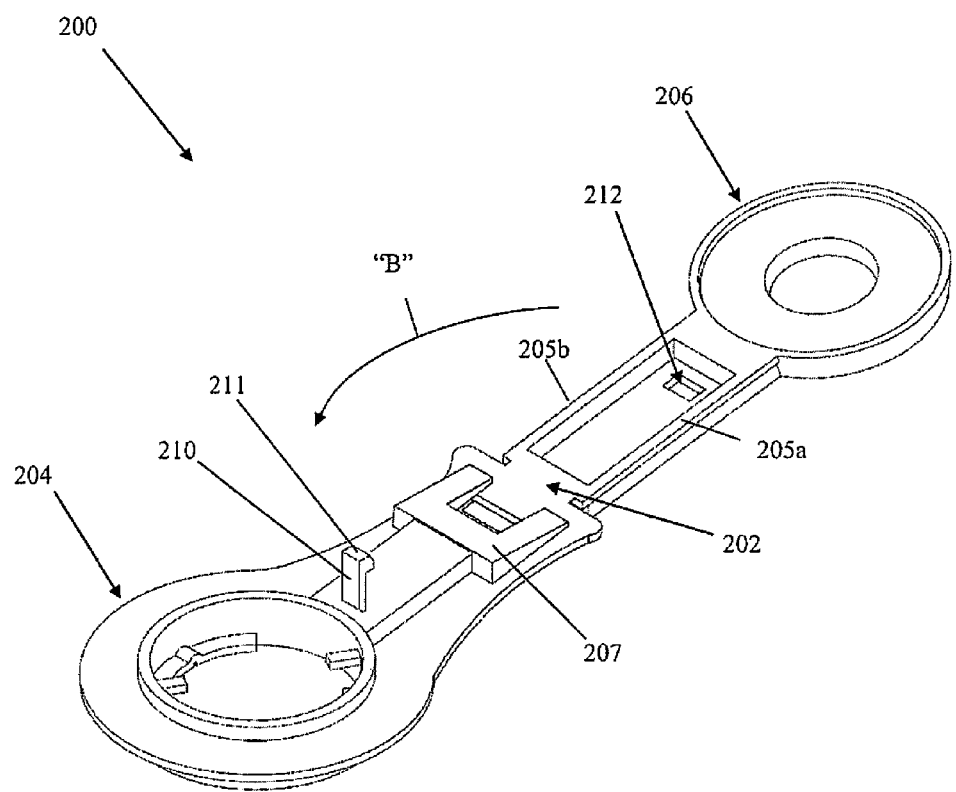
FIG. 5A is an isometric view of a further alternative embodiment of an internal filter frame structure according to the disclosure, showing the device in the unassembled configuration.
Figure 5B:
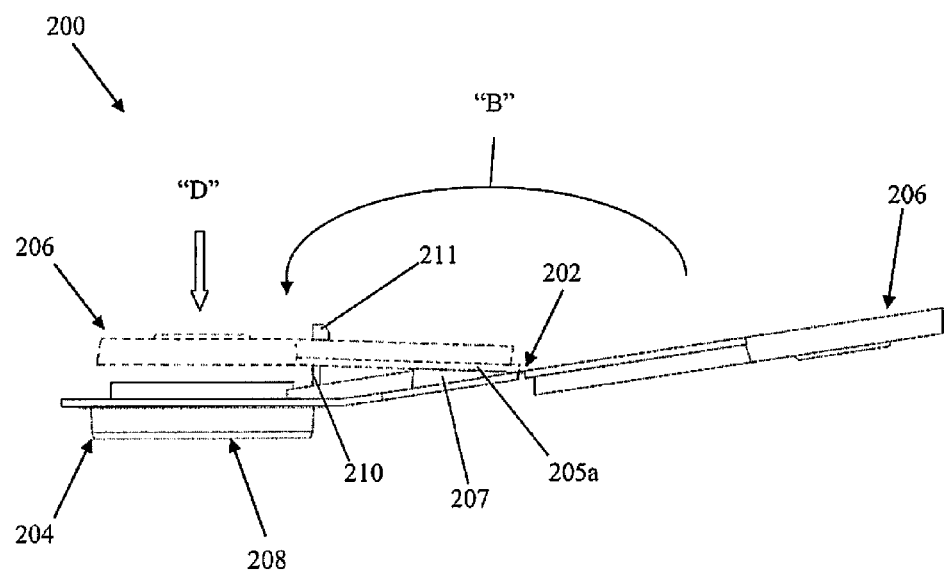
FIG. 5B is a side view of the frame structure of FIG. 5A in the unassembled and assembled configurations.

FIGS. 5A and 5B show yet another biasing arrangement for a frame structure 200 in accordance with the disclosure. As with the previous embodiments, the frame structure 200 includes lower and upper halves 204, 206 connected at a living hinge 202. With the FIG. 5A, 5B embodiment, however, outward biasing is provided by a fulcrum ramp 207 on the lower half 204 which bears upon first and second side portions 205a, 205b of the upper half 206 when the halves are folded together at the living hinge 202 to obtain an assembled configuration. The lower and upper halves 204, 206 are held in the assembled configuration by a snap connector, which in this embodiment include an arm 210 positioned on the lower half 204, which is configured to be received in a recess 212 in the upper half 206. The arm 210 can include a barbed tip 211 at a distal end thereof. Thus arranged, when the lower and upper halves 204, 206 are folded together along the living hinge 202 in the direction of arrow "B," the arm 210 is pressed into the recess 212 of the lower half 204. A surface adjacent to the recess 212 contacts the barbed tip 211 and pushes the arms 210 back slightly so that the arm can pass into the recess 212. Once the barbed tip 211 passes through the recess 212, the arm 110 springs back to lock the arm 210 in the recess 212, thereby locking the halves 204, 206 together. If desired, the halves 204, 206 can be unlocked by pressing the tip 211 back and pulling the arm 210 back through the recess 212.

As noted, when the upper half 206 is locked to the lower half 204, the first and second side portions 205a, 205b of the upper half 206 bear against the fulcrum ramp 207, which biases the upper half 206 away from the lower half 204 and spaces the upper half 206 a distance away from the breathing tube 208 in a manner similar to that shown in relation to the prior embodiments. This provides the previously described open plenum configuration, which is the normal operating configuration. As with the prior embodiments, to perform fit testing, slight pressure can be applied to the upper half 206 to overcome the bias and to seal the upper half 206 to the breathing tube 208.

As with the previous embodiments, the embodiment of FIGS. 5A and 5B can be molded as a single piece in the flat configuration shown. Folding the lower and upper halves 204, 206 together in the direction of arrow "B" configures the frame structure 200 into the assembled configuration (i.e., standard operating position) as previously described.

With the exception of the described alternative biasing arrangements, the frame structures 100, 200 include the same features as the frame structure 1. For example, the lower half 104, 204 includes a breathing tube 108 that can be configured to connect to a respirator (not shown) using any of a variety of connection arrangements (e.g., bayonet, thread, push to connect, etc.). The upper halves 106, 206 may include a soft seal 20 on the upper half 6 to seal against the breathing tube 8. As previously noted, the soft seal 20 may be a piece of die cut rubber or elastomeric material attached to the surface of the upper half 6. Alternatively, the soft seal 20 may be an overmolded piece of material suitable to provide a desired sealing between the upper half 6 and the breathing tube 108, 208.

Figure 6A:
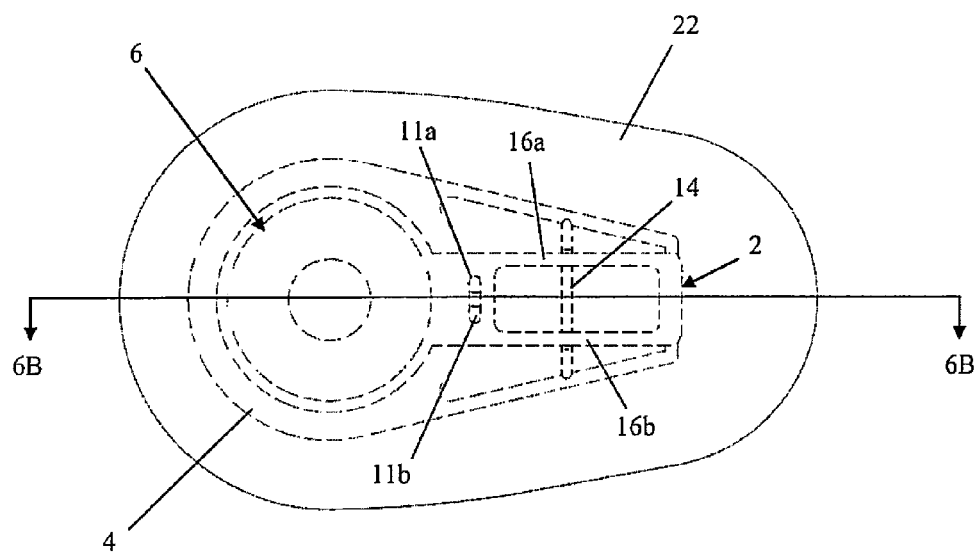
FIG. 6A is a top transparent view of the internal filter frame structure of FIG. 1 showing the device in the assembled configuration and in context with a filter element.
Figure 6B:
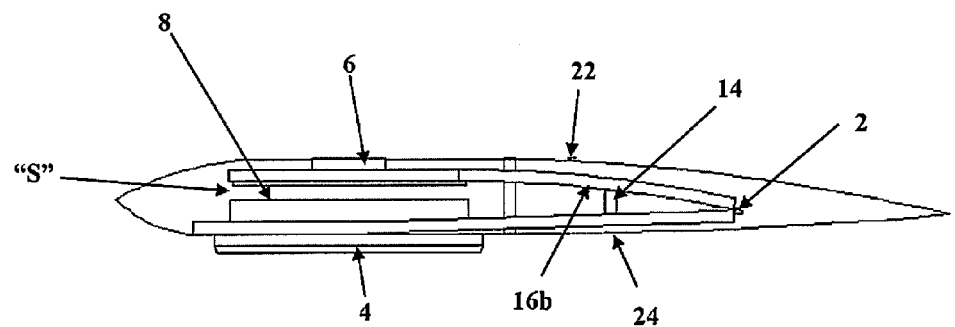
FIG. 6B is a cross section view of the frame structure and filter element of FIG. 6A, taken along line 6B-6B of FIG. 6A.

FIGS. 6A and 6B show the disclosed frame structure 1 in relation to a low profile particulate filter (i.e., a pancake style filter) including a plurality of filter media portions 22, 24. The configuration of FIGS. 6A and 6B illustrates a standard position for maintaining a plenum between top 22 and bottom 24 filter media portions, with space "S" formed between the upper half 6 and the breathing tube 8. As will be appreciated, this arrangement allows for even air flow distribution through all parts of the filter media when the device is in the standard position. As will be appreciated, the frame structure 1 can be implemented in any application in which a pancake style filter is used. Although FIGS. 6A and 6B show the frame structure 1 in relation to the filter media portions 22, 24, it will be appreciated that a substantial similar configuration will be obtained using the frame structures 100, 200 described in relation to FIGS. 4A, 4B, 5A and 5B.

As previously noted, the disclosed frame structure 1, 100, 200 can be molded as a single piece. Thus, the structure can be made from any of a variety of polymer materials, including polypropylenes, polyethylenes and derivations thereof.

A variety of benefits are provided by the disclosed device. For example, incorporating a living hinge into the design enables the structure to be molded as a single flat piece, and then folded into the standard configuration. Such an arrangement can reduce part count as well as cost and complexity of parts/tooling.

Figures 7A, 7B:
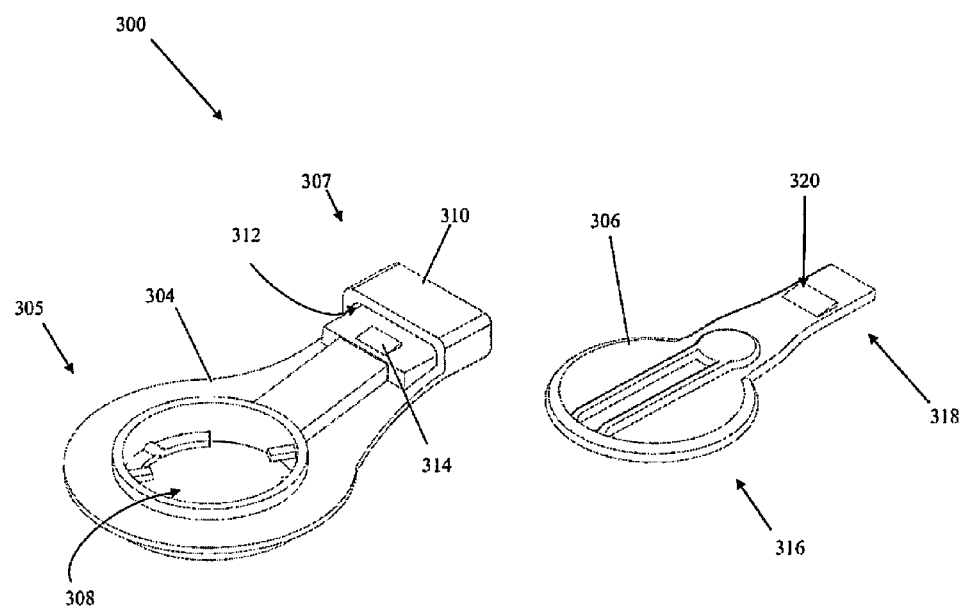
FIGS. 7A and 7B are isometric views of a multi-piece embodiment of the internal filter frame structure according to the disclosure.
Figure 8:
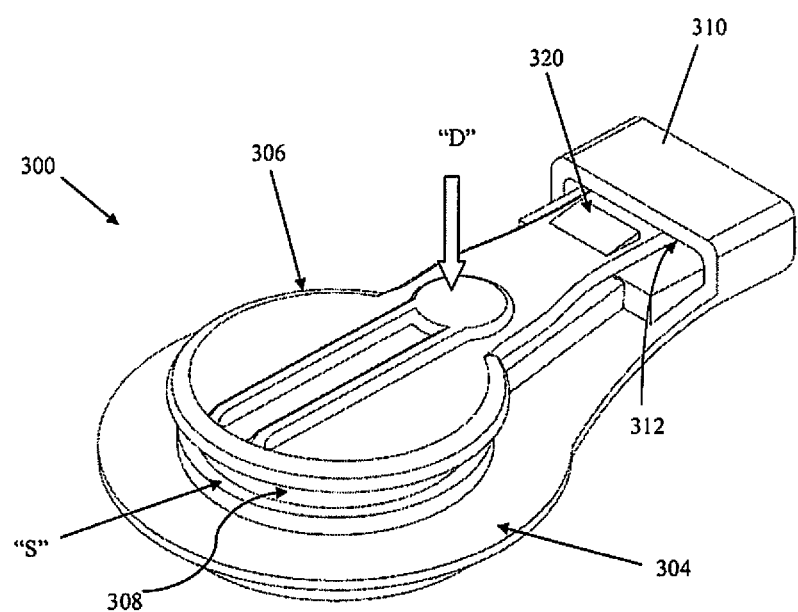
FIG. 8 is an isometric view of the internal filter frame structure of FIGS. 7A and 7B in the assembled configuration.

Referring now to FIGS. 7A, 7B and 8, an embodiment of the disclosed frame structure 300 is shown in which the lower and upper halves 304, 306 are not connected by a living hinge, but rather are provided as separate pieces. The lower half 304 can include a breathing tube end 305 and an opposite engagement end 307. The breathing tube end 305 includes a breathing tube 308 similar to that described in relation to the previous embodiments. The engagement end 307 includes a receiving structure 310 having a recess 312 disposed therein and configured to receive a portion of the upper half 306. A raised snap member 314 is positioned adjacent to the mouth of the recess 312.

The upper half 306 of the frame structure 300 has a sealing cover end 316 and an opposite engagement end 318. The engagement end 318 has a snap element 320 with an underlying recess (not shown) configured to receive the raised snap member 314 of the lower half 304 when the engagement end 318 is received in the recess 312.

FIG. 8 shows the lower and upper halves 304, 306 in the assembled configuration. The upper half 306 overlies the lower half 304, and the respective engagement ends 307, 318 of the lower and upper halves are coupled together. Specifically, the engagement end 318 of the upper half 306 is slid into the recess 312 of the receiving structure 310 of the lower half 304 until the raised snap member 314 snaps into the underlying recess of the snap element 320. In this assembled configuration, the sealing cover end 316 of the upper half 306 is biased away from the breathing tube 308 of the lower half to provide a space "S" between the upper half 306 and the breathing tube 308. As with previous embodiments, this arrangement allows for even air flow distribution through all parts of the associated filter media when the device is in the standard position.

A negative pressure leak check can be performed by pressing down on the upper half 306 in the direction of arrow "D." By applying a light force to the upper half 306, the user can selectively seal the breathing tube 308 to achieve a seal between a soft seal (similar to that shown in FIG. 3) on the upper half 306 and the breathing tube 308. In one embodiment, the soft seal may be a piece of die cut rubber or elastomeric material attached to the surface of the upper half 306. Alternatively, the soft seal may be an overmolded piece of material suitable to provide a desired sealing between the upper half 306 and the breathing tube 308.

The lower and upper halves 304, 306 may be coupled permanently or semi-permanently using adhesives, plastic welding and/or riveting techniques, in addition to or as an alternative to the illustrated snap configuration.

It will be appreciated that by providing the lower and upper halves 304, 306 as separate pieces, the two can be fabricated from different materials. One advantage of such an arrangement is that the lower and upper halves can be of different flexibilities, strengths, toughnesses or other desired physical characteristic. One or both of the upper and lower halves 304, 206 can be formed from a polymer such as polypropylene, polyethylene, and derivations thereof.

Using a biasing arrangement to bias the device into the standard position enables fine control of the force necessary to affect a fit seal. Further, providing a substantially open breathing tube allows for retrofitting of any type of connection method, and also maintains the profile of the filter very low where it connects to a respirator.

Also, the negative pressure mechanism frame structure enables a plenum to be held open when not performing a seal test. Use of a soft seal to seal against the breathing tube provides enhanced sealing efficiency with low force. Other advantages will be apparent to those of skill in the art.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A single piece filter frame structure comprising:
   a frame having upper and lower halves and a living hinge disposed therebetween, the upper and lower halves configured to cooperate with a low profile particulate filter, the upper and lower halves comprising a snap joint for engaging the upper half to the lower half when the frame is folded at the living hinge to maintain the structure in an assembled configuration, the lower half including a breathing tube that extends through the lower half, the upper half including a top sealing mechanism configured to seal against the breathing tube, the upper and lower halves further comprising a fulcrum and beam combination to bias the top sealing mechanism and the breathing tube apart from one another;
   wherein the frame in the assembled configuration basis selectively movable between an open plenum configuration and a negative pressure check configuration, in the open plenum configuration the top sealing mechanism is spaced apart from the breathing tube and a filter plenum is held open, in the negative pressure check configuration the top sealing mechanism seals against the breathing tube to close the filter plenum and to facilitate seal and leak tightness of a facepiece associated with the filter frame structure, wherein the frame in a standard operating position is held in the open plenum configuration due to the bias of the fulcrum and beam combination.

2. The single piece filter frame structure of claim 1, wherein the fulcrum and beam combination includes a beam on the upper hall and a fulcrum on the lower half, the frame being configured to be selectively moved to the negative pressure check configuration by applying a force on the top sealing mechanism towards the breathing tube, the force required to configure the frame in the negative pressure check configuration being controllable by controlling at least one of a cross section of the beam, a length of the beam, a position of the fulcrum, and a position of the snap joint.

3. The single piece filter frame structure of claim 2, wherein at least one of the cross section of the beam, the length of the beam, and the position of the fulcrum is selected to minimize the force required to configure the frame in the negative pressure check configuration to minimize translation of the force through the facepiece.

4. The single piece filter frame structure of claim 1, wherein when the frame is in the assembled configuration, the frame is selectively moved from the open plenum configuration to the negative pressure check configuration by applying a force to an outer surface of the top sealing mechanism towards the breathing tube, which moves the upper half toward the lower half in opposition to the bias of the fulcrum and beam combination so that the top sealing mechanism seals against the breathing tube.

5. The single piece filter frame structure of claim 4, wherein the top sealing mechanism of the upper half includes a soft seal to facilitate sealing of the breathing tube.

6. The single piece filter frame structure of claim 4, wherein when the force applied to the outer surface of the top sealing mechanism is removed, the bias of the fulcrum and beam combination automatically causes the frame to transition back to the open plenum configuration such that the top sealing mechanism moves apart from the breathing tube and the filter plenum opens.

7. The single piece filter frame structure of claim 1, wherein the standard operating position of the frame is the position of the frame during ordinary use by a user of the filter frame structure, the open plenum configuration when the frame is in the standard operating position being configured to allow the user to inhale and exhale through the filter plenum that is open, the top sealing mechanism not sealing to the breathing tube while the frame is in the standard operating position.

8. The single piece filter frame structure of claim 7, wherein when the frame is in the negative pressure check configuration the user is not able to inhale or exhale through the filter plenum that is closed, allowing the user to perform a negative pressure fit check to test seal and leak tightness of the facepiece associated with the filter frame structure.

9. A filter structure comprising:
a frame having an upper portion and a lower portion, the upper and lower portions configured to cooperate with a low profile particulate filter, the lower portion including a breathing tube for connecting to an associated port of a respirator, the upper portion including a top sealing mechanism configured to seal against the breathing tube, the upper and lower portions including a fulcrum and beam combination to bias the top sealing mechanism and the breathing tube apart;
wherein the frame is selectively movable between an open plenum configuration and a negative pressure check configuration;

wherein when the frame is in the open plenum configuration, the top sealing mechanism is spaced apart from the breathing tube and a filter plenum is open;
wherein when the frame is in the a negative pressure check configuration, the top sealing mechanism seals against the breathing tube to close the filter plenum and to facilitate seal and leak tightness of a facepiece associated with the filter structure; and
wherein, in a standard operating position, the frame is held in the open plenum configuration due to the bias of the fulcrum and beam combination.

10. The filter structure of claim 9, wherein the upper portion and the lower portion are formed as separate pieces.

11. The filter structure of claim 9, wherein the upper and lower portions are connected by at least one of a snap joint, a sonic weld, a permanent joining arrangement and a semi-permanent joining arrangement.

12. The filter structure of claim 9, the upper and lower portions further comprising a snap joint for engaging the upper portion to the lower portion when the frame is in an assembled configuration, the snap joint to maintain the structure in the assembled configuration.

13. The filter structure of claim 12, wherein the frame is configured to be selectively moved from the open plenum configuration to the negative pressure check configuration by applying a force on the top sealing mechanism towards the breathing tube, the force required to close the filter plenum is controllable by controlling at least one of a cross section of the beam, a length of the beam, a position of the fulcrum, and a position of the snap joint.

14. The filter structure of claim 13, wherein at least one of the cross section of the beam, the length of the beam, the position of the fulcrum, and the position of the snap joint is selected to minimize the force required to close the filter plenum to minimize translation of the force through the facepiece.

15. The filter structure of claim 9, wherein the frame is configured to be selectively moved from the open plenum configuration to the negative pressure check configuration by applying a force on the top sealing mechanism towards the breathing tube, the force being applied to an outer surface of the top sealing mechanism in opposition to the bias of the fulcrum and beam combination so that the top sealing mechanism seals against the breathing tube.

16. The filter structure of claim 9, wherein the top sealing mechanism of the upper portion includes a soft seal to facilitate sealing of the breathing tube.

17. A filter arrangement comprising:
a frame having upper and lower halves and a living hinge disposed therebetween;
a low profile particulate filter positioned to cooperate with the upper and lower halves;
wherein the lower half of the frame includes a breathing tube for connecting to an associated port of a respirator, and the upper half includes a seal configured to seal against the breathing tube;
wherein the frame further comprises a snap joint for engaging the upper half and the lower half when the frame is folded at the living hinge in an assembled configuration, the snap joint configured to maintain the frame folded in the assembled configuration;
wherein the lower half further includes a fulcrum to engage a beam of the upper half to bias the seal and the breathing tube apart when the frame is in the assembled configuration, the bias retaining the seal at a spaced distance apart from the breathing tube when the frame in the assembled configuration is in a standard operating position; and wherein when the frame is in the assembled configuration, a force applied to an outer surface of the upper half moves the upper half toward the lower half in opposition to the bias of the fulcrum and the beam so that the seal engages and seals against the breathing tube.

18. The filter arrangement of claim 17, wherein the bias of the fulcrum and the beam holds a plenum of the low profile particulate filter open when the frame in the assembled configuration is in the standard operating position.

19. The filter arrangement of claim 17, wherein the force required to seal the seal of the upper half against the breathing tube is controllable by controlling at least one of a cross section of the beam, a length of the beam, a position of the fulcrum, and a position of the snap joint.

20. The filter arrangement of claim 19, wherein at least one of the cross section of the beam, the length of the beam, and the position of the fulcrum is selected to minimize the force required to seal the seal to the breathing tube and configure a plenum of the low profile particulate filter closed.

\* \* \* \* \*